Patented Jan. 12, 1932

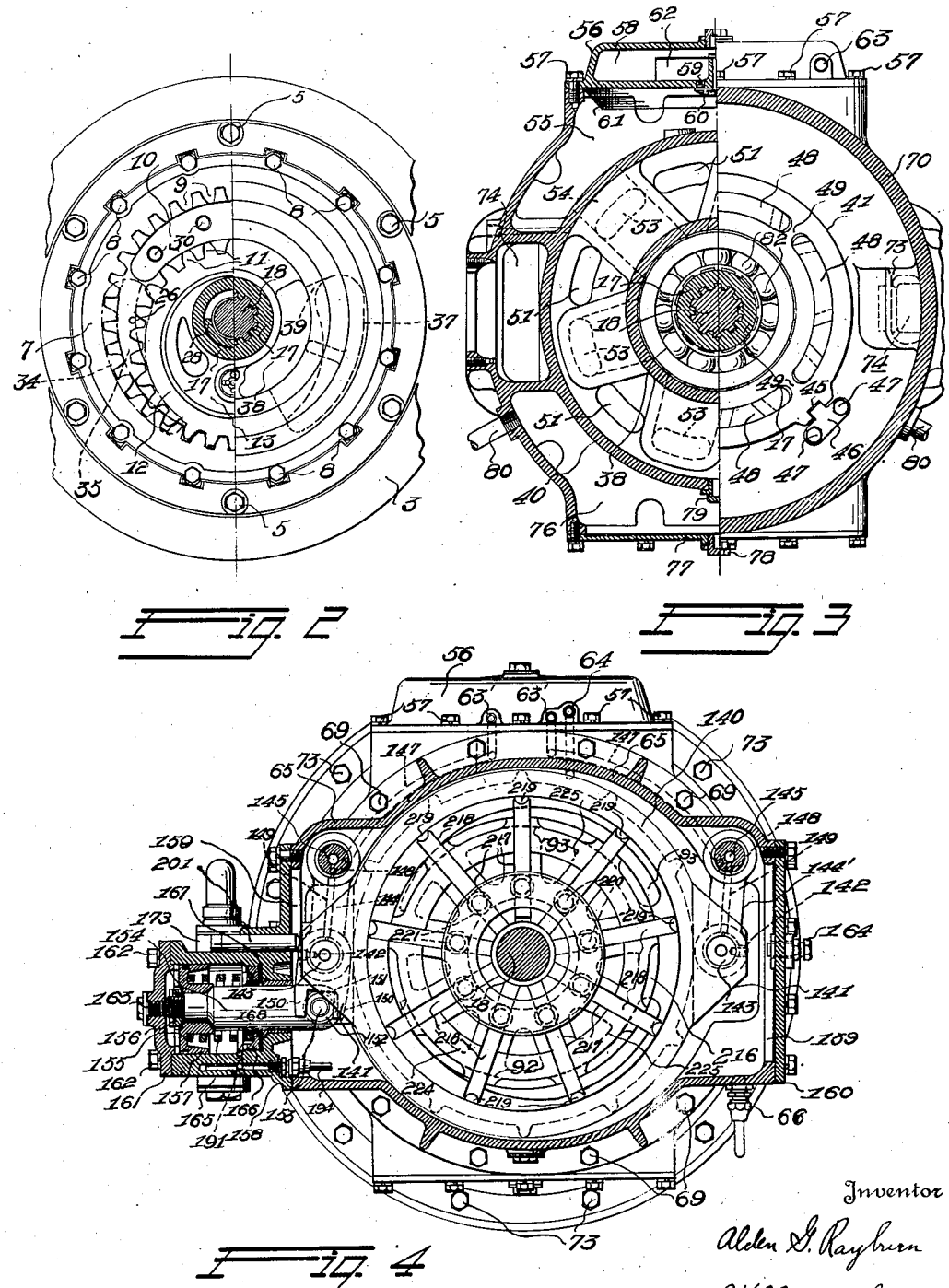

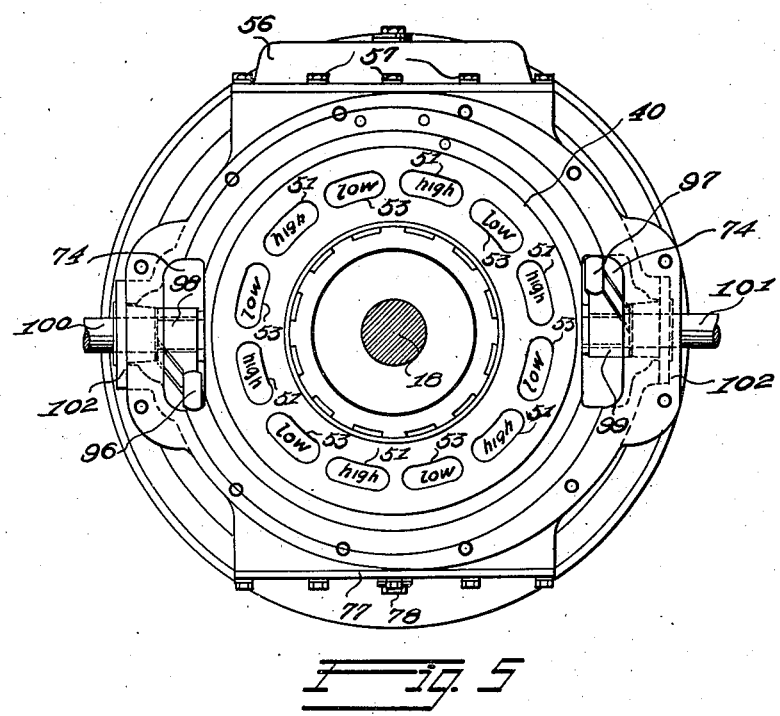
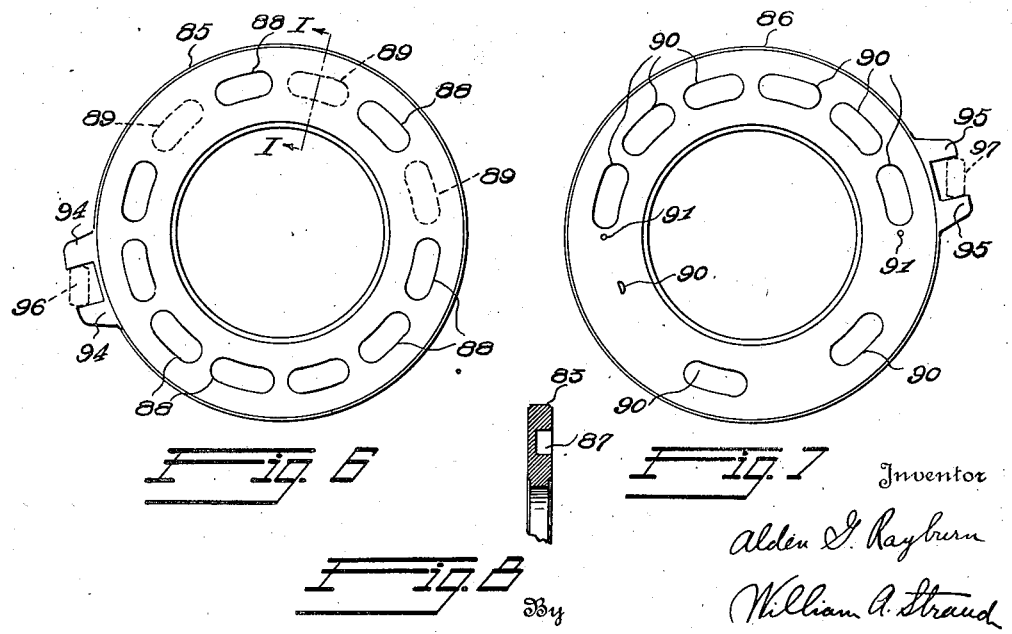

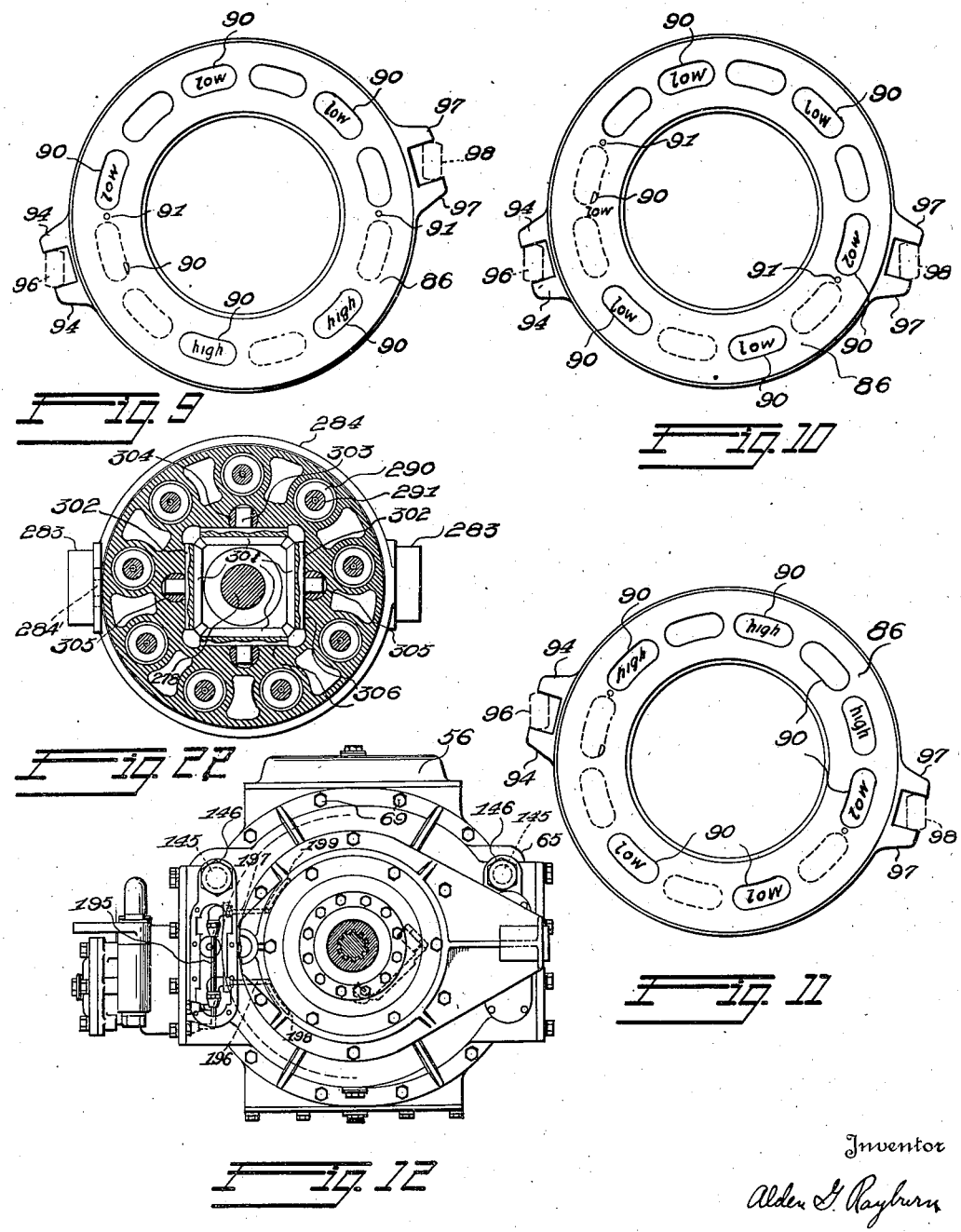

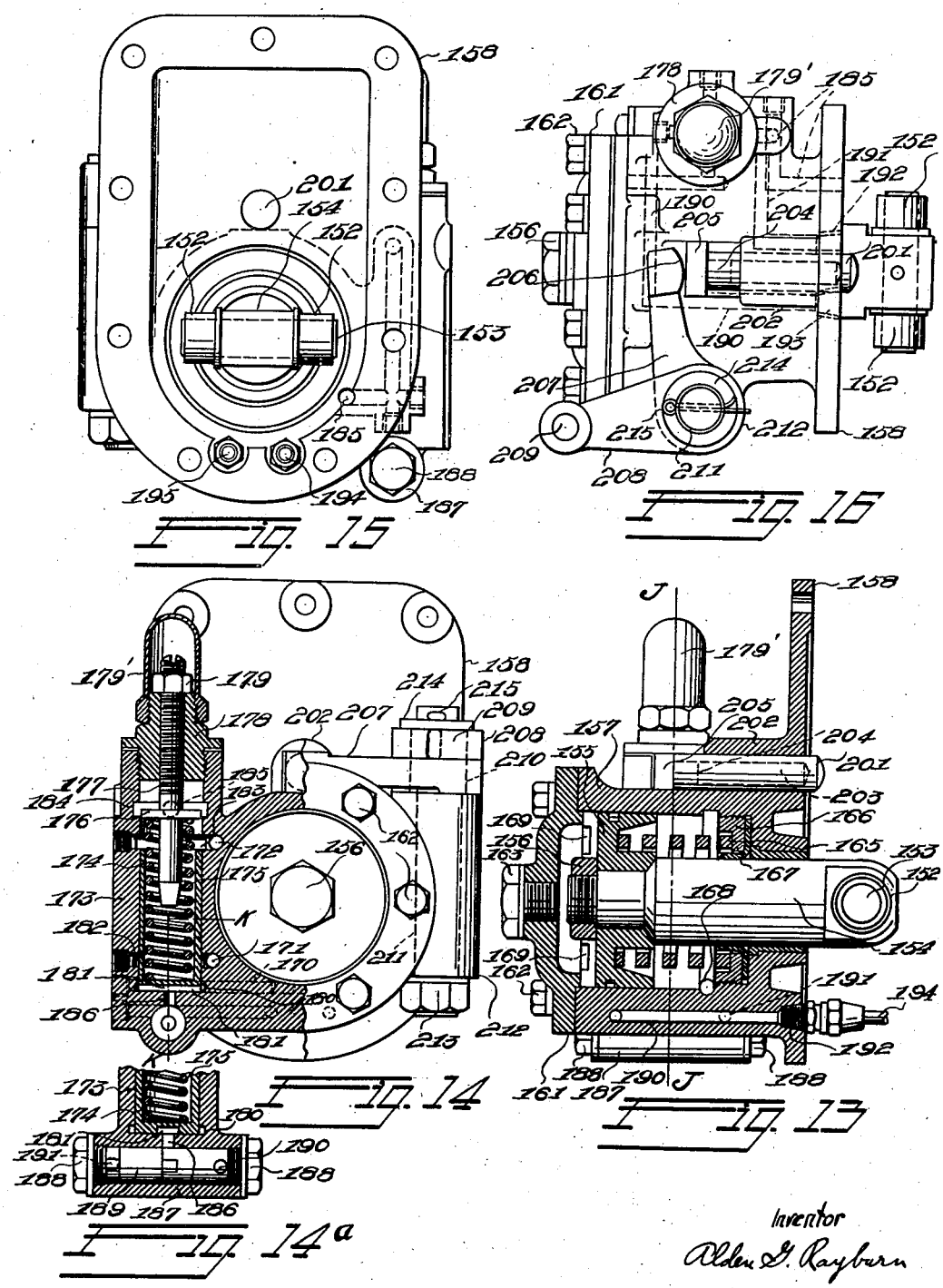

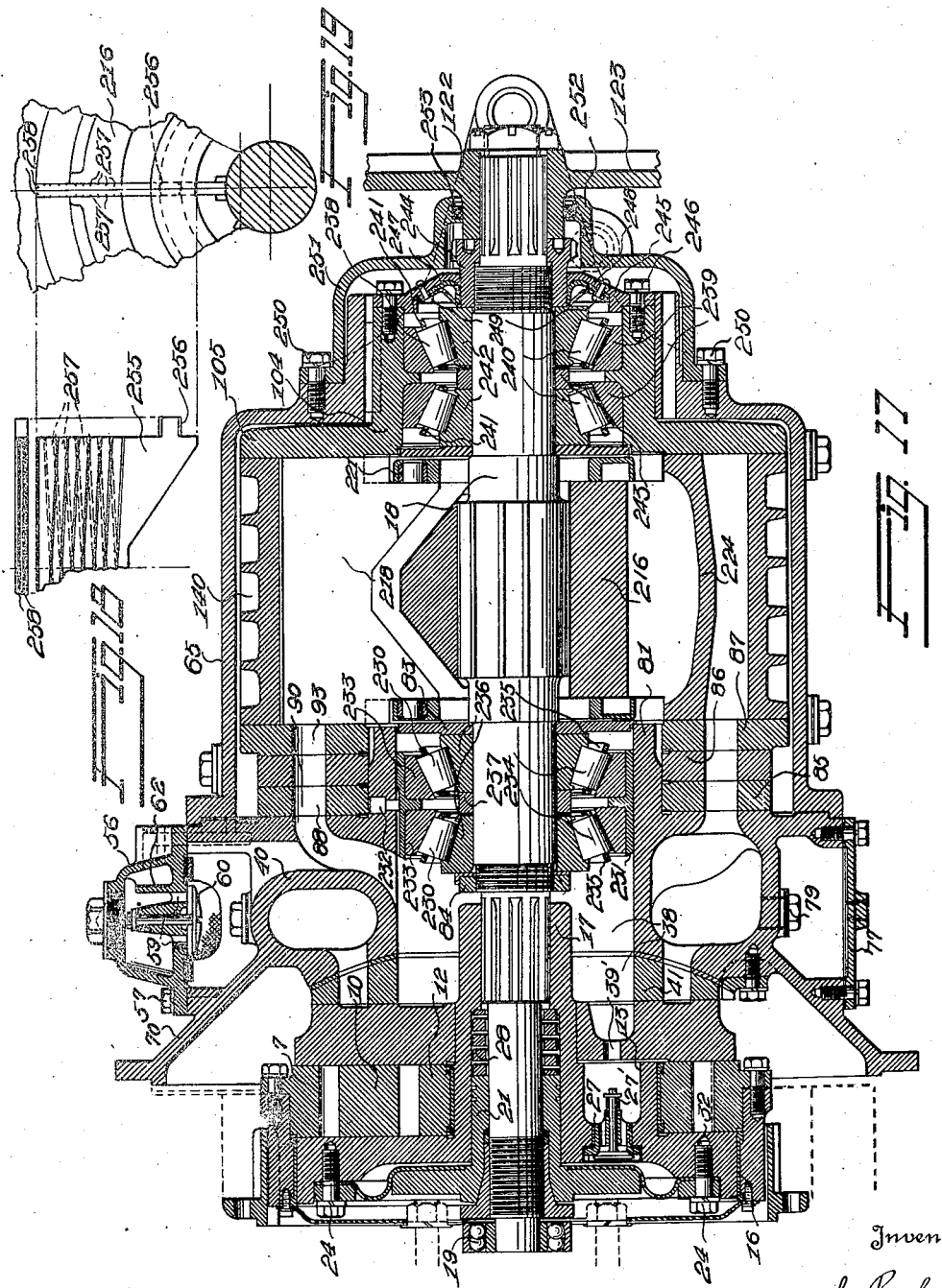

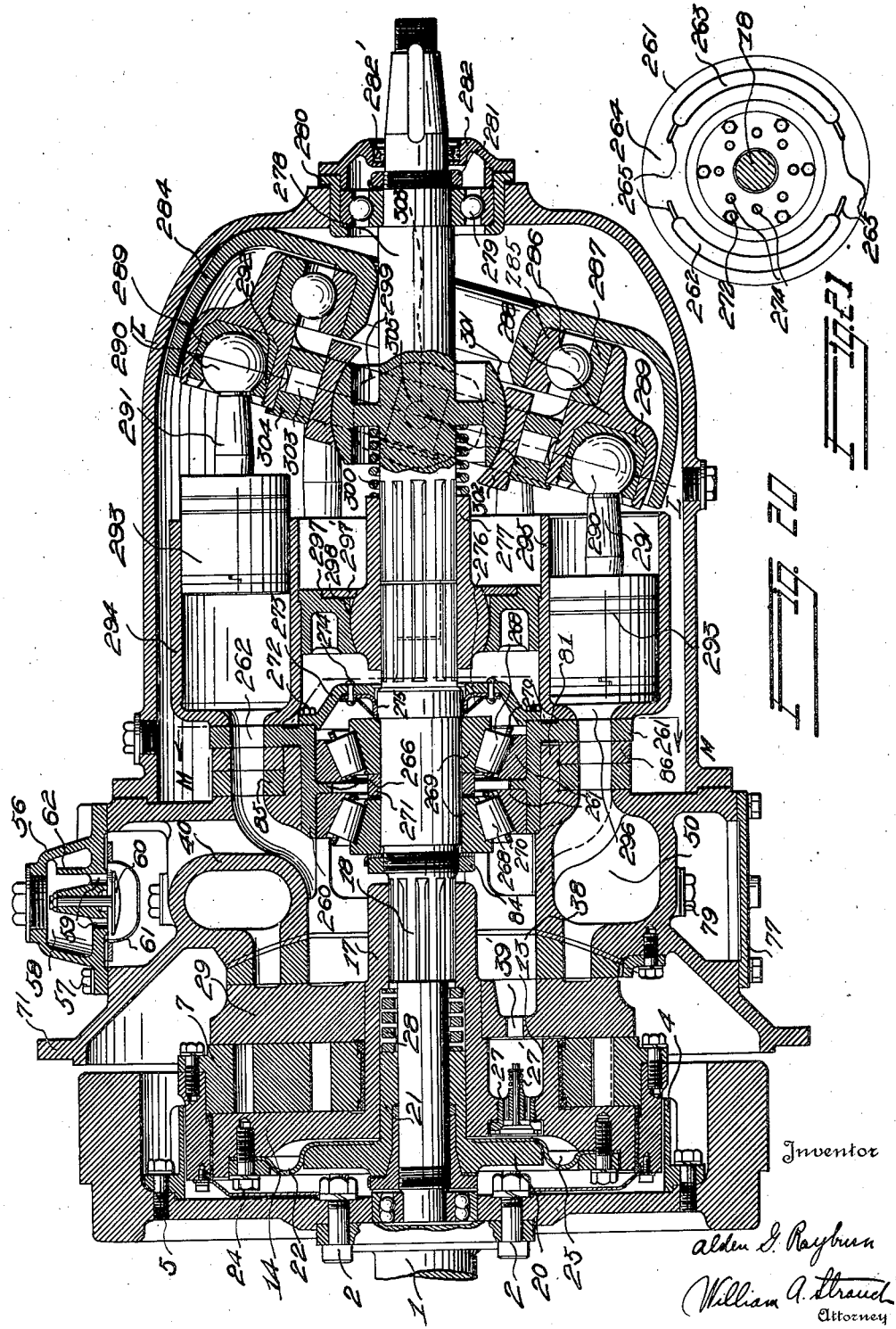

1,840,876

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

POWER TRANSMITTING APPARATUS

Application filed September 7, 1927. Serial No. 218,067.

The present invention relates to power transmitting apparatus and more particularly to hydraulic torque multiplying power transmissions.

The preferred forms of inventions hereinafter disclosed are of the type of transmission in which the maximum pumping occurs with maximum torque multiplication, and in which the fluid comes to rest when the mechanism is in direct couple or the driving and driven members are rotating substantially at the same speed. In the development of the preferred forms of the invention special types of pump, motors, bearings and control arrangements, have been devised the principles of which are applicable in various relations independent of those hereinafter set forth, and it is to be understood that the use of such features in other relations is contemplated as within the scope of the present invention.

In hydraulic transmissions heretofore developed one of the most common forms utilized is that involving piston pumps and piston motors. Pumps and motors of the piston type, however, produce rapid reciprocations of the operating fluid. At the higher speeds, the fluid cannot follow the pump pistons so that failure of the pump to pick up fluid at higher speeds, as well as agitation of the fluid to cause foaming or emulsification, occurs, resulting in failure of operation at the higher speeds. The piston pump and motor types of hydraulic transmission accordingly are inherently limited to relatively low speed operation, and are generally not satsifactory for the transmission of power at more than approximately five or six hundred revolutions per minute.

To permit higher speed operation than has heretofore been feasible with the piston type pump and motor transmission, various forms of rotary pumps and motor mechanisms and combinations of rotary pumps with piston motors have been proposed most of which are impractical. I have heretofore devised transmissions involving combinations of rotary pumps with piston type motors in which the fluid passes continuosly in a single direction through the pump, eliminating the reciprocation of fluid in the pump. Because of the large bearings required in the reciprocating piston motors for this type of transmission and the driving reaction developed in order to multiply the torque satisfactorily the maximum safe operating speed for this type of transmission has been approximately 1,500 revolutions per minute. The bearing cost and cost of construction are prohibitive for utilization of this type of transmission in usual automobile practice.

To meet the requirements of a transmission for use with modern high speed automobile engines, speeds in excess of 2,500 revolutions per minute must be safely transmitted, while the cost of construction must compare favorably with the cost of the comparatively low priced gear transmissions at present in use in automobiles. I have devised novel mechanisms utilizing both rotary pumps and rotary motors, of special construction to meet the severe requirements of high speed automotive transmissions at comparatively low cost.

Accordingly a primary object of the present invention is to provide novel hydraulic transmissions of comparatively simple, rugged and low-cost construction, adapted for use with modern internal combustion automobile engines.

Another object of the invention is to provide novel and efficient rotary type pumps and motors adapted for high speed operation, and particularly adapted for use in hydraulic transmissions, but the principles of which are applicable in various other relations.

Still another object of the present invention is to provide hydraulic transmissions embodying novel automatic and manual control mechanisms.

A further object of the invention is to provide a novel variable capacity motor construction, together with automatic controls therefor, useful particularly in hydraulic transmissions, but the principles of which are applicable to variable capacity pumps and in other relations.

Still a further object of the invention is the provision of a novel rotary pump construction having means for holding the pump parts in fluid sealing engagement, while permitting variations due to temperature changes of the parts without binding, especially designed for hydraulic transmissions, but useful in independent relations.

Other objects of the invention are such as may be attained by a utilization of the various combinations, subcombinations and principles hereinafter set forth in the varied relations to which they are obviously applicable by those skilled in the art, and as defined by the terms of the appended claims.

As shown in the drawings—

Figure 2 is a transverse sectional view, the left half taken along line A—A of Figure 1, and the right half taken along line B—B of Figure 1.

Figure 3 is a transverse sectional view, the left half being taken along line C—C of Figure 1, and the right half being taken along line D—D of Figure 1.

Figure 4 is a transverse sectional view taken along the line E—E of Figure 1.

Figure 5 is a transverse sectional view taken along an irregular line the general course of which is indicated by characters F—F', F''—F'', F'—F of Figure 1.

Figure 6 is a view taken along line G—G of Figure 1 showing the clutch and reverse valve construction.

Figure 7 is a view taken along line H—H of Figure 1 showing the lock off and reverse cooperating valve construction.

Figure 8 is a fragmental sectional view taken along line I—I of Figure 6.

Figure 9 is a detailed view taken along line H—H of Figure 1 showing the relative position of the valve parts for forward automatic operation.

Figure 10 is a detailed view taken along line H—H showing the position of the valve parts in direct drive position.

Figure 11 is a detailed view taken along line H—H of Figure 1, showing the relative position of valve parts for reverse operation.

Figure 12 is a rear elevation partially in section with covers removed, showing the automatic pipe connections and control mechanism for the motor.

Figure 13 is a fragmental sectional view through the differential motor actuating cylinder of the automatic control mechanism shown in Figure 12.

Figure 1:
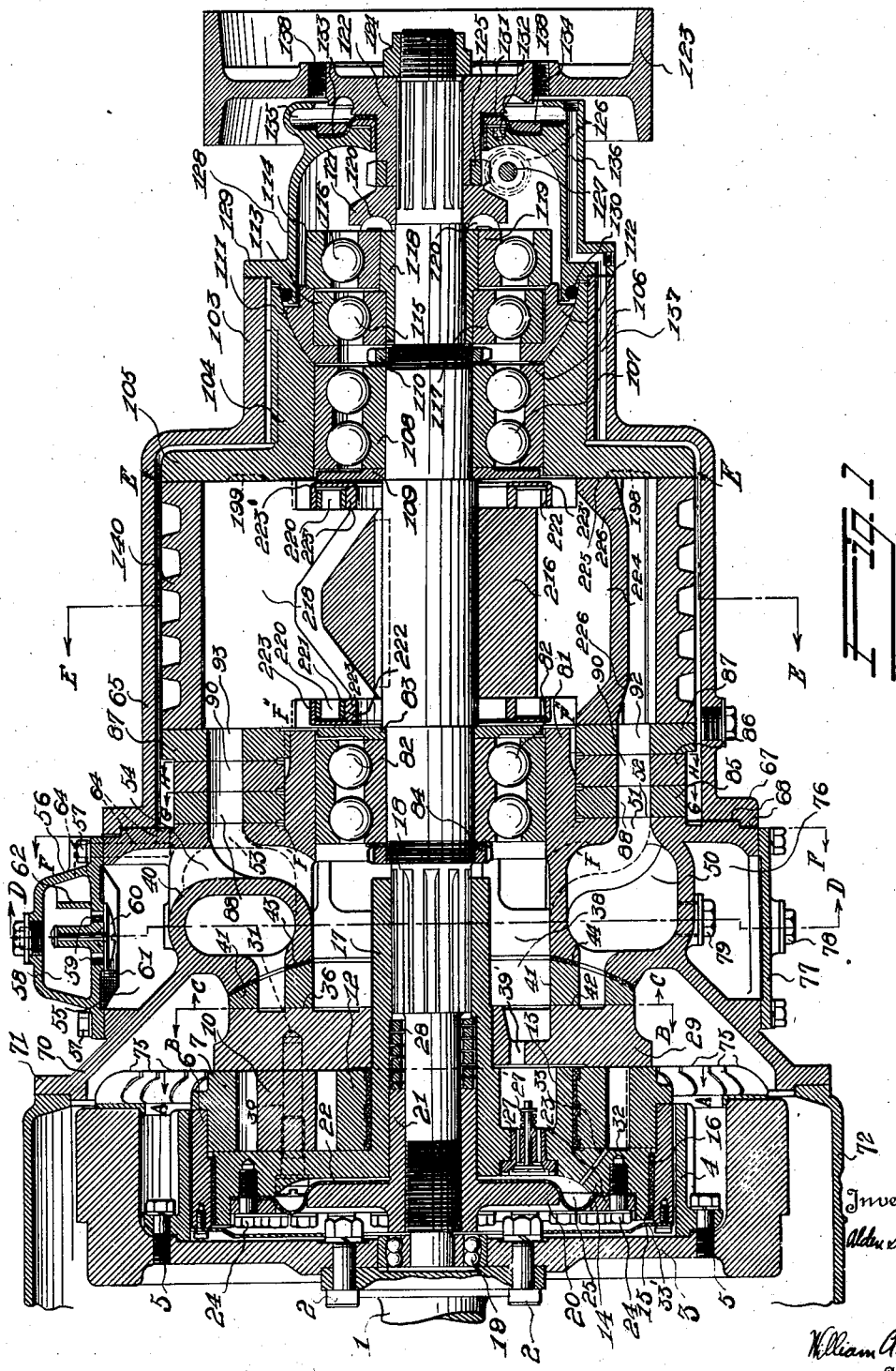
Figure 1 is a vertical sectional view through a preferred form of hydraulic transmission embodying my invention.

Figure 14 in its left half is a sectional view taken along the line J—J of Figure 13, and in its right half is a rear elevation of the control mechanism shown in Figures 12 and 13.

Figure 14a is a fragmental sectional view taken along line K—K of Figure 14.

Figure 15 is a front elevation of the automatic control mechanism shown in Figures 12 to 14.

Figure 16 is a top view of the control mechanism shown in Figures 12 to 15.

Figure 17 is a vertical longitudinal sectional view of a modified form of transmission embodying the invention in which a combined radial and thrust bearing is utilized.

Figures 18 and 19 are fragmental detailed views showing a modified form of motor construction adapted for use with the forms of invention so far described.

Figure 20 is a vertical longitudinal sectional view of a further modification of the invention utilizing a piston type motor.

Figure 21 is a detailed sectional view taken along line M—M of Figure 20.

Figure 22 is a detail view showing the universal joint for the motor shown in Figure 20, the section being taken on line L—L of Figure 20.

As shown in Figure 1, connected to a shaft 1 of a suitable prime mover, such for example, as a gasoline or internal combustion engine, by means of the securing bolts 2, is a flywheel 3 to which the end flange of a cylindrical drive member 4 is secured by means of the studs 5. Formed in the drive member 4 are internal series of driving teeth or splines which mesh with the teeth or splines of cylindrical pump ring gear supporting member 6 to which pump ring gear 7 is secured by means of cap screws 8. (Figure 2.) Gear 7 is provided with internal gear teeth 9, the inner surfaces of which are adapted to rotate in fluid sealing engagement with the outer surface of sealing segment 10 and which mesh with the teeth 11 of a pump pinion 12 opposite the center of segment 10. The tops or outer surfaces of pinion teeth 11 are adapted to rotate in fluid sealing engagement past the inner surface of sealing segment 10. Pinion 12 is journaled on eccentric 13 which is formed integrally with the pump side wall member 14 (Figure 1). Formed on side wall member 14 is a suitable cylindrical pilot bearing section 15 on which the bearing surface 16 of cylindrical ring gear supporting member 6 is journaled for rotation. A central tubular driving quill section 17 is formed integrally with pump side wall member 14, the end of which is slidably splined to the driven or tail shaft section 18. Tail shaft 18 at its forward end is slidably journaled in pilot bearing 19, the outer race of which is supported and secured in fly-wheel 3. Threaded on the end of shaft 18 is a diaphragm supporting member 20 provided with a cylindrical pilot extension 21 fitting slidably into a central bore formed in quill 17. Secured to member 20 by welding or in any other suitable manner is the inner end of a flexible diaphragm 22 preferably of metal, the outer end of which is secured in a suitable recess formed in pump side wall member 14 by means of a securing ring 23 and the securing cap screws 24. The diaphragm 22 and a recess in pump side wall member 14 are arranged to form a fluid chamber 25. In operation of the mechanism, fluid under pressure is admitted to chamber 25 continuously from the high pressure side of the pump through a small hole 26 (Figure 2) formed through the side wall 14 or from the low pressure side of the pump through the poppet check valve 27 threaded into a suitable opening formed in pump side wall 14. The passage area of valve 27 is substantially greater than the area of hole 26 for a reason that will more fully hereinafter appear. During normal forward operation the spring 27' of check valve 27 together with fluid pressures developed in chamber 25 hold the check valve closed. The fluid pressure in chamber 25 holds pump side wall member 14 together with gear 7, sealing segment 10, and pinion 12 in fluid sealing engagement with the fluid distributing plate 29 with a predetermined pressure in operation of the device as will more fully hereinafter appear. Surrounding shaft 18 and interposed between the end of the tubular extension 21 of member 20 and the ends of splines formed in the end of quill 17 is a helical compression spring 28, normally under compression to force the quill 17 together with the pump side wall 14 to the right in Figure 1 with relation to shaft 18. Slidably mounted on quill 17 is a pump end wall and fluid distributing plate 29 against the inner surface of which gear 7, sealing segment 10, and pinion 12 abut. Countersunk in and passing through side wall member 14 and threaded into suitable securing and guide holes formed in segment 10 are the supporting and aligning screw pins 30 which secure segment 10 to a side wall 14 and the ends of which slidably extend into suitable supporting guide and aligning holes 31 formed in plate 29 to drive the latter in unison with quill 17 and side wall 14. Formed in side wall 14 adjacent the point where teeth 9 and 11 of gear 7, and pinion 12 mesh is a relieved section 32 connected by a drilled hole 33 to the chamber 25 to permit small quantities of fluid trapped in the tooth depressions to pass into chamber 25 thereby relieving or eliminating hammer noises in the operation of the mechanism. To provide lubrication for bearing 15, a plate 33' is secured to the forward end of member 6 by means of suitable screws which traps leakage fluid from the pump, the leakage fluid being fed to bearing 15 by the action of centrifugal force.

Formed in the left face (Figure 1) of member 29 is high pressure or outlet port 34 shown by the broken lines in Figure 2 which connects with the irregular shaped distributing port 35 also shown in broken lines in Figure 2 and formed in the timing face 36 (Figure 1) of the plate 29. A fluid inlet or suction port 37 formed in the left face (Figure 1) of plate 29 is connected with central annular fluid storage space 38 through passage 39 (Figure 2), and space 38 is connected to poppet valve 27 by the opening 39' (Figure 1) formed in plate 29.

Annular storage space 38 is formed centrally in a fluid receiving and storing casting 40 around quill 17 (Figures 1 and 3) and in an aligning member 41 (Figure 1) which is provided with a distributing face 42 contacting with the distributing face 36 of plate 29. Member 41 is provided with a convex spherical seating surface 43 which seats in a suitable complemental spherical surface 44 lined with bearing metal, formed in the casting 40. Member 41 is provided with a slot 45 (Figure 3) into which a projection of stop or locking member 46 extends. Member 46 is secured to casting 40 by means of cap screws 47 and prevents rotation of the member 41 while at the same time permitting a limited universal aligning movement thereof.

Formed in the timing face 42 of member 41 and extending through the member 41 is an annular series of high pressure fluid ports 48 (Figure 3) separated by the strengthening ribs 49 forming a substantially 360 degree inlet passage to annular high pressure fluid storage chamber 50 (Figure 1) of casting 40. Communicating with high pressure fluid chamber 50 is a series of high pressure outlet ports 51 (Figures 1 and 3) which terminate in face 52 of casting 40. Ports 51 are spaced equally around the face 52 and alternate with the low pressure ports 53 which terminate in face 52 and communicate with the central low pressure fluid storage chamber 38. The upper ports or passages 53 are connected by a plurality of fluid inlet passages 54 to fluid storage reservoir space 55 formed in the top of casting 40. Casting 40 is provided with a cover 56 for the chamber 55 which is secured in position by the cap screws 57. Formed in cover 56 is a fluid inlet and overflow chamber 58 connected by the openings 59 in its lower wall to chamber 55. Slidably supported in a suitable central boss formed in the lower wall of cover 56 is the stem of a poppet valve 60, which under sudden surges of fluid and pressure closes openings 59 and shuts off communication between the chamber 55 and chamber 58. A suitable filter screen 61 secured on the bottom of cover 56 prevents the entry of foreign material with the fluid from chamber 58 into the chamber 55, and filters the operating fluid returned to reservoir space 38. Formed in chamber 58 is an overflow wall 62 determining the level to which the fluid may rise in chamber 58, due to fluid pumped into the chamber 58 through the fluid inlet connection 63 (Figure 3) from a suitable circulating pump such for example as the oil pump bypass connection of the prime mover. The wall 62 forms a discharge compartment for the overflow fluid which first passes through the lubricating ducts 63' (Figure 4) and as the level rises it passes through the overflow duct 64 to the rear transmission casing section 65, the bottom of which is drained through the return pipe connection 66 (Figure 4) to the engine crank case or to the suction side of the circulating pump. From the duct 63' the fluid passes through lubricating passages for the motor in a manner that will more fully hereinafter appear. Casing section 65 is provided with a securing flange 67 (Figure 1) having locating surfaces 68 which fit against and are adapted to engage suitable complemental locating surfaces formed on casting 40, which serve to accurately locate the casing section 65 with relation to casting 40, the casing 65 being secured to casting 40 by securing bolts or studs 69 (Figure 4). Casting 40 in turn has formed integrally therewith the supporting casing section 70 which is provided with the securing and locating flange 71 secured to the engine bell housing or fly-wheel casing 72 by means of securing studs or bolts 73 (Figure 4).

Formed integrally with the casting 40 and casing section 70 are a pair of diametrically opposite fluid catch pockets 73 (Figure 3) open at their top and connected by passages 74 extending through the sides of casting 40 to the interior of casing section 65. Secured to the fly-wheel 3 by means of suitable securing screws, are a plurality of blades 75 (Figure 1) shaped to dip into fluid that accumulates in the casing 70 and bell housing 72 as the fly-wheel rotates and to throw it upward so that a substantial part thereof will continuously drop into the pockets 73 and pass by gravity through the side chambers 74 (Figures 3 and 5) of casing 40 into the interior of casing 65 whereby the building up of an excessive level of fluid in the bell housing 72 and casing section 70 due to leakage is prevented in operation of the mechanism.

To provide for control of the temperature of the operating fluid in operation of the mechanism, a water chamber or space 76 is provided in casting 40 extending from chambers 74 around the bottom of casting 40 which is provided with a bottom cover plate 77 secured in position by suitable cap screws. Cover plate 77 is provided with a drain plug 78 and when removed gives access to plug 79 for draining the high pressure fluid chamber 50. Water or cooling fluid may be circulated through space 76 by means of pipe connections 80. When the mechanism is utilized with an internal combustion engine water from the cooling jacket of the engine is preferably circulated through space 76 before being passed to the cooling radiator and in this way temperature of the operating fluid may be held at a value conducive to efficient operation.

Formed integrally with casting 40 is a tubular extension 81 (Figure 1), in a central bore of which the outer race of antifriction bearing 82 is slidably mounted. The inner race of bearing 82 abuts against a disk 83 which abuts against a shoulder of tail shaft 18, the inner race and disk being held in position on tail shaft 18 by threaded collar 84. Disk 83 is slightly smaller in diameter than the central bore of tubular extension 81 and in operation rotates with the tail shaft 18 throwing fluid out by centrifugal force and preventing surges of fluid from the storage space 38 past the bearing 82, as well as acting as a guide for the motor rings 223 and 223'.

Supported slidably and rotatably on the periphery of tubular extension 81 is the clutch control and reversing valve plate 85 and the lock-off and cooperating reverse valve plate 86, also slidably keyed on the end of extension 81 is the motor side wall and distributing plate 87. As shown in Figures 1 and 6, formed in the clutch plate 85 (Figures 1 and 6) is a plurality of through ports 88 and a plurality of ports 89 extending partially through plate 85. Ports or passages 88 and 89 are arranged to register with the ports 51 and 53 of the casting 40 to permit circulation of the fluid for power transmission, and to interconnect the ports 51 and 53 to establish a by-pass of fluid independently of the motor when a neutral position is desired to be established and as will more fully hereinafter appear.

Formed in the lock-off and reverse cooperating control plate 86 are the ports or fluid passages 90 so shaped and spaced as to register with ports 88 of valve plate 85 and to align with ports 51 and 53 of casting 40 for control purposes. Relief holes 91 formed in plate 86 are positioned to prevent locking of the motor housing due to formation of fluid pockets. This is accomplished by the valve plate 85 being shifted to neutral or declutching position thereby bringing the holes 91 in register with the low pressure, and are blanked off when the valve parts are in position for power transmitting operation of the mechanism as will more fully hereinafter appear. Formed in motor end wall plate 87 are elongated fluid ports 92 and 93 (Figure 4) through which fluid from ports 90 of plate 86 is circulated through the motor.

Plates 85 and 86 are provided with projecting lugs 94 and 95 respectively which are engaged by the operating ends 96 and 97 (Figure 5) of the valve operating arms 98 and 99 which are disposed in chambers 74 of casting 40 and are rigidly secured to the spindles 100 and 101. Spindles 100 and 101 have their inner ends supported for rotation in suitable bearings formed in casting 40 and in the bearing members and cover plates 102 for chambers 74 secured to the casting 40 in any suitable manner. By rotating shafts 100 and 101 in various combinations, it will be seen that the relative angular position of the plates 85 and 86 with respect to each other and with respect to casting 40 and motor end wall plate 87 may be varied to vary the alignment of the fluid ports. Any suitable type of control mechanism may be utilized for actuating the spindles 100 and 101 to control the positions of the valve plates as will be apparent to those skilled in the art.

Formed integrally with the casing section 65 is a cylindrical extension 103 (Figure 1) provided with a cylindrical bore in which the tubular extension 104 of the motor side wall member 105 is slidably keyed and supported. Supported in a central bore formed in the member 104 is the outer race 106 of an anti-friction or ball bearing 107, the inner race 108 of which is mounted on tail shaft 18 and abuts against a disk 109 which is of slightly smaller diameter than the diameter of the central bore of member 104 and abuts against a shoulder of the tail shaft. Race 108 and the disk 109 are secured in position on tail shaft 18 by means of a threaded collar 110.

Formed in the outer end of tubular extension 104 is a spherical seating surface 111 in which a complemental spherical surface of thrust bearing supporting and aligning member 112 is seated. Seated in and abutting against the aligning member 112 are the outer races 113 and 114 of the anti-friction bearings 115 and 116 respectively, the inner race 117 of bearing 115 being secured rigidly on a sleeve 118 which in turn is slidably mounted on a reduced section of the tail shaft 18. Inner race 119 of bearing 116 is slidably mounted on an enlarged section of sleeve 118. A plurality of thrust equalizing or rocker members 120 seated in suitably curved slots formed in thrust collar 121 abut against the end of sleeve 118 and race 119 equalizing the end thrust of collar 121 on the bearings 115 and 116.

Thrust collar 121 is mounted on tail shaft 18 and abuts against the forward end of the hub section 122 of the brake drum and drive coupling member 123. Hub section 122 is slidably splined on the rear end of tail shaft 18 and the lock nut 124 threaded on the end of the tail shaft locks collar 121 and the hub section 122 securely on the tail shaft. Secured on the forward end of hub 122 is a driving gear 125, which meshes with and drives the gear 126. Gear 126 drives a shaft 127 journaled in and extending through the end cap or housing member 128 which encases the bearings 115 and 116 and is provided with a securing flange 129 secured to the end of extension 103 of casing section 65. A suitable packing 130 is supported in a projection formed in the forward end of member 128 and engages the spherical seating surface 111 of member 104 to prevent loss of fluid from the casing section 65.

Shaft 127 may be utilized to drive a speedometer for a motor vehicle, or to operate any other appurtenances of the vehicle or of the transmission.

Slidably mounted on the hub 122 is the supporting sleeve section of a packing member 131 the outer surface of which fits in a suitable bore formed in the end of housing section 128. A plurality of springs 132 arranged in suitable recesses in member 128 are arranged to press packing member 131 outward into engagement with a packing leather 133, yieldingly forcing the packing leather into engagement with a flat sealing surface of the hub 122. The outer end of packing leather 133 is secured in a suitable recess in the end of the housing section 128 and is held in position by a securing ring 134. Formed on the end of casing section 128 is an annular channel 135 which catches any leakage fluid passing the packing structure just described. The leakage fluid trapped in the channel 135 passes by gravity through ducts 136 and 137 formed in the casing section 128 and extension 103, and returns to the interior of the casing 65 from where it passes out through the connection 66 (Figure 4) and is returned to the connection 63 (Figure 3).

To provide a suitable drive connection to the tail shaft of the mechanism the threaded holes 138 are arranged to receive securing studs or screws for a universal drive member of any suitable type.

The arrangement of thrust bearings 115 and 116 together with the related parts is such that end thrust exerted on the shaft 18 through the action of fluid pressure in chamber 25 on diaphragm 22 will be transmitted through the lock nut 124, hub 122, thrust collar 121 and the equalizing rocker members 120 to the race 119 and through sleeve 118 to race 117 of bearings 115 and 116 so that the load will be divided between the bearings 115 and 116. The thrust is then transmitted through the outer races of the bearings 115 and 116 to the aligning member 112 and is exerted on seat 111 of the member 104 urging the member 104 and motor side wall member 105 integral therewith to the left in Figure 1, while at the same time permitting a universal aligning or seating movement of the motor side wall member 105 against the end face of the motor housing casting 140 and forcing opposite face of the housing casting 140 against the motor side wall timing plate 87 as clearly shown in Figure 1.

In this way it will be seen a novel bearing arrangement of small diameter has been provided through which heavy thrusts may be supported at high speeds and through which the end thrust exerted on tail shaft 18 by the action of the fluid pressure on the diaphragm 22 holds the motor parts and valve plates in fluid sealing relation without causing excessive bearing pressures to develop.

As shown in Figure 4, the motor housing 140 is provided at its opposite sides with pairs of supporting projections or ears 141. Secured in suitable bores formed in ears 141 and held against rotation by set screws 142 are the supporting wrist pins 143. Wrist pins 143 are journaled in suitable bushings supported in the lower ends of links 144 and 144' which in turn are journaled at their upper ends on pins 145. As shown in Figure 12 the pins 145 are provided at their outer ends with the hexagonal heads 146 adjacent the threaded end sections, threaded into the suitable supporting sections formed in the casing section 65. The inner ends of the pins 145 are supported and fit partially into bores formed in the casing 65 which also form catch pockets for lubricant between the bottom of the bores and the ends of pins 145 to which lubricant is fed from the ducts 63' (Figure 4) through the passages or ducts 147 formed in the casing, the fluid supply coming from the overflow chamber of cap 56 as hereinbefore set forth. Drilled in the center of pins 145 are lubricating passages 148 which through suitable passages feed lubricant to the upper bearing section of links 144 and 144' supported on the pins 145 and through the passages or ducts 149 formed in links 144 and 144' feed lubricant to the lower bearing sections of the links supporting the pins 143 of the motor housing. In this way it will be seen that lubricant is continuously supplied to pins 143 and 145 and the bearing sections of links 144 and 144' giving adequate lubrication under the heavy strains of operation.

Formed integrally with the left link 144 in Figure 4 are a pair of actuating extensions 150, in which the square recesses or slots 151 are cut. Slidably fitting into the slots 151 are the bearing rollers or members 152 in which the ends of actuating pin 153 are journaled. The mid-section of pin 153 is journaled in the control piston rod 154 of an automatic control mechanism (Figures 4, 13 and 14) which regulates the volumetric capacity of the motor in accordance with operation of the device. Piston rod 154 is provided with a reduced end section on which the differential piston 155 is secured by means of the lock nut 156 threaded on the end thereof.

Piston 155 is mounted for reciprocation in a control cylinder 157 which is preferably formed integrally on a supporting plate 158. Plate 158 serves to cover one of the openings 159 (Figure 4) formed in casing section 65 adjacent link 144, the opposite opening 159 of casing 65 being closed by a removable cover plate 160 adjacent link 144' providing ready access to the link mechanism within the casing 65 and the ready removal of the control unit. Cylinder 157 is provided with a removable head 161 which is held in position by the securing studs or cap screws 162. Threaded into the center of head 161 is plug 163, and threaded into the center of the cover plate 160 is an adjustable stop member 164 against which the right link 144' in Figure 4 is adapted to abut to determine the maximum volumetric capacity of the motor.

Piston 155 with its connected parts is normally urged toward the left in Figure 4 by a helical compression spring 165 interposed between the piston and the collar 166 of a packing member which fits into the inner end of cylinder 157 and serves as a seat for the inner end of spring 165, at the same time holding packing member 167 in fluid sealing position around the piston rod 154 to prevent substantial loss of fluid from the interior of cylinder 157 around rod 154.

Actuating fluid for piston 155 is admitted to cylinder 157 through ports 168 and 169 (Figure 13) which are connected by the passages or ducts 170 and 171 and 172 respectively to the interior of control cylinder 173. Mounted in cylinder 173 is a piston valve 174 which is provided with an internal bore in which one end of valve spring 175 is seated. The other end of valve spring 175 abuts against a collar 176 of the compression adjusting member 177 adjustably threaded into the end plug 178 of cylinder 173. A lock nut 179 threaded on the protruding end of member 177 locks the member 177 in adjusted position and a cap 179' threaded on plug 178 encases the adjusting member 177 and nut 179. Formed in the inner end of cylinder 173 is an annular fluid distributing duct or groove 180 which communicates with the passage 170 and through which fluid is admitted to the cylinder 157. Cut into and across the end of valve 174 is a fluid distributing groove 181, the ends of which are in communication with groove 180 in the position of parts shown. Formed in the walls of cylinder 173 are grooves 182 and 183 which communicate with the passages 171, 172, and an annular groove 184 which communicates with exhaust passage or duct 185. As shown in Figures 15 and 16 the passage or duct 185 terminates in an opening in the inner face of the plate 158 establishing communication between the outlet end of cylinder 173 and the interior of casing section 65.

Fluid under pressure is admitted through the groove 181 to the interior of cylinder 173 through passage 186 (Figures 14 and 14a) from a control valve cylinder 187, the ends of which are closed by threaded plugs 188. Mounted for reciprocation in the interior of cylinder 187 is a control valve member 189, the position of which determines whether communication is established between fluid passage 190 or 191 and passage 186. Passages 190 and 191 as shown in Figures 13, and 16 terminate in threaded pipe connections 192 and 193 on the interior face of plate 158 and, threaded into pipe connections 192 and 193 (Figure 16), are fluid supply pipes 194 and 195. Pipes 194 and 195 as shown in Figure 12 are connected by suitable pipe connections to passages 196 and 197 formed in the motor end wall 105. Passages 196 and 197 communicate with slots 198 and 199 cut into the inner face of the motor end wall 105, so that in operation of the mechanism, fluid pressures will be supplied through passage 198 or 199 and pipe 194 or 195 to the interior of cylinder 187 through passage 190 or 191 depending upon the direction of rotation of the motor.

In operation of the automatic control mechanism so far described with pressures cut off from the motor by operation of the cut off valve plate as will more fully hereinafter appear, no fluid pressure will be built up in either of the supply pipes 194 or 195. Under such conditions valve 174 will be held in the position shown in Figure 14 by its spring 175 and passage 169 of cylinder 157 will be in communication through interior of cylinder 173 and passages 172 and 185 with the interior of casing section 65, and piston 155 will be forced to the left in Figure 13 under the influence of spring 165, moving motor housing 140 to the position of minimum or substantially zero eccentricity and volumetric capacity of the motor. The passage 185 is located at a point higher than the fluid level in the control cylinder 157, thereby keeping sufficient fluid for satisfactory operation present at all times. With the motor functioning for torque multiplication, fluid pressures will be built up in slot 198 or 199 depending whether the motor is running forward or in reverse direction, and fluid under pressure will be forced from the slot 198 or 199 into pipe 194 or 195, as the case may be. This fluid will be admitted into cylinder 187 through port 190 or 191 shifting the valve 189 towards the low pressure side of the cylinder, and opening port 186 to the high pressure side of cylinder 187. When the port 186 is open, fluid under pressure will pass therethrough into the groove 181 of valve 174 and through groove 181 of cylinder 173 into passage 170, port 168, and into the interior of cylinder 157 aiding spring 165 to hold the piston 155 to the left in Figure 13 until the pressures developed exceed a predetermined amount. When the resistance to rotation of the tail shaft 18 is such that sufficiently high fluid pressures are developed in the high pressure side of the motor to cause yielding of spring 175, valve 174 will shift, compressing the spring 175. The initial movement of valve 174 will close the annular passage 183 and will cut off the passage 172 from the discharge passage 185 and in this position of parts, no fluid can escape from cylinder 157 through ports 169 and piston 155 together with the motor housing and related parts are hydraulically held in predetermined position. Further movement of valve 174 against the compression of spring 175 as the fluid pressure rises will cause the end of the valve 174 to pass beyond and uncover the groove 182 of cylinder 173 admitting fluid under pressure through passage 171 and the lower port 169 (Figure 13) into the opposite side of cylinder 157. It will be noted that the area of left face of piston 155 in Figure 13 is substantially greater than the area of the opposite face and the parts are so proportioned that when fluid under pressure is admitted through the passage 171 the differential pressure exerted on the piston 155 due to this difference in area is sufficient to shift the piston 155 together with motor housing 140 and the connected parts against the compression of spring 165. As will more fully hereinafter appear, shifting of the motor housing in this manner increases the torque multiplying ratio of the mechanism so that when the load on the tail shaft exceeds a predetermined value the torque multiplication is automatically increased. With a given load, as the torque multiplying ratio of the mechanism increases the fluid pressures decrease and spring 175 will restore valve 174 toward its position shown in Figure 14. The movement of piston 155 will continue to the right in Figure 13 until a balance is reached where valve 174 will seal grooves 182 and 183 locking the fluid in the left end of cylinder 157 (Figure 13) while fluid under pressure will continuously be admitted through the passage 170 and port 168 to the opposite end of the cylinder. When the balanced condition is reached it will be seen that the piston 155 is hydraulically held against movement thereby holding the volumetric capacity of the motor at the necessary value to overcome the resistance to turning of the tail shaft, with the fluid pressure predetermined by the compression of spring 175. In this way it will be seen that the position of piston 155 and motor housing 140, together with the related parts, will be determined by the fluid pressures developed and by the compression of the spring 175. It will accordingly be noted that the fluid pressures necessary to cause shifting of the piston 155 and the motor housing may be readily varied by removing cap 179' and changing the position of the compression adjusting member 177.

It will accordingly be seen that a novel combination of automatic control mechanism for the motor has been provided which when the fluid pressures are cut off from the motor, holds the motor in its position of minimum volumetric capacity, while during operation of the motor, and independently of the direction in which the motor is operating, the control mechanism functions so that when the fluid pressures in the motor exceed a predetermined value, the mechanism functions to vary the volumetric capacity of the motor. Accordingly, a novel combination of automatic control mechanism with a reversible motor has been provided which is an important feature of my invention.

To provide for the shifting of motor housing 140 manually for deceleration and braking purposes as will more fully hereinafter appear, an actuating plunger 201 is provided (Figures 4 and 13 to 16) slidably mounted in a suitable bore formed in a boss 202 formed integral with the cylinder 157 and plate 158. The inner end of plunger 201 abuts against the lower end of the motor supporting link 144. Formed in the outer end of plunger 201 is a bore 203 in which an extension 204 of actuating head 205 is supported. Actuating head 205 is preferably of hardened and ground metal and is engaged by the curved surface 206 (Figure 16) of the actuating bell crank arm 207. Formed integrally with arm 207 is an actuating arm 208 provided with a hole 209 by means of which it may be connected to a suitable operating cable or linkage. Arms 207 and 208 from a bell crank member which is pivotally supported on enlarged section 210 of a supporting pin 211 which is held in position in the boss 212 (Figure 14) formed integrally with cylinder 157, by means of securing nut 213. The bell crank is held in position on extension 210 by means of a washer 214 and a cotter pin 215.

When it is desired to shift the motor housing independently of the automatic mechanism, the fluid pressure is released by operating the clutch valve as will more fully hereinafter appear, and arm 208 is actuated to shift arm 207 clockwise in Figure 16 shifting head 205 and plunger 201 to the right in Figure 4, causing link 144 and the motor housing piston 155 and the connected parts to shift to the right against the compression spring 165. By varying the position of the plunger 201 the limit of movement of housing 140 to the left in Figure 4 and the minimum volumetric capacity of the motor operating under influence of the automatic control mechanism may be manually predetermined. Also as will more fully hereinafter appear, the position of the motor housing may also be manually adjusted by operating plunger 201 while the automatic control mechanism is functioning and the clutch plate closed for running position thereby providing for braking and deceleration of the vehicle.

As shown in Figures 1 and 4, slidably keyed or splined to tail shaft 18 within the motor housing 140 is an actuating rotor 216 provided with a plurality of radial slots 217 preferably nine in number in which the actuating vanes or blades 218 are slidably mounted. Formed in the outer ends of the vanes or blades 218 are concave cylindrical grooves in which the aligning and sealing tips 219 having complemental cylindrical aligning surfaces are seated. Formed adjacent the inner end of each vane 218 is a pair of axially aligned roller supporting pintles 220 upon which rollers 221 are journaled. Rollers 221 are nested in annular grooves or recesses 222 formed by the vane shifting rings 223 and 223' which are mounted between the discs 83 and 109. Rotor 216 is suitably cored as indicated at 224 to lighten the construction while leaving suitable metal thickness for strength. Formed on the ends of rotor 216 adjacent its periphery are fluid sealing faces 225 which are adapted to come into substantial fluid sealing engagement with the inner faces of the motor side wall plates 87 and 105 and to prevent substantial fluid leakage between the fluid pockets formed by the rotor and the vanes 218 in operation of the mechanism.

To provide for a maximum area for flow of fluid into the motor and at the same time to provide means for centralizing the rotor between the motor end walls 87 and 105, the periphery of the rotor is inclined inwardly as indicated at 226 in the spaces between the vanes 218 and the pressures developed on the inclined surfaces 226 it will be seen, tend to centralize the rotor between the motor side wall plates 87 and 105.

In operation of the motor, with housing 140 and the rotor concentric, vanes 218 will extend equally around the rotor 216, the motor has a zero volumetric capacity, and can by its operation deliver no power. When housing 140 is shifted from its concentric position to the right in Figure 4, the movement of housing 140 will shift vanes 218 on the left of the vertical plane in Figure 4 inward, thereby forcing rings 223 and 223' with the remaining vanes 218 outward while maintaining sealing tips 219 in fluid sealing engagement with the inner surface of housing 140 and will establish an eccentric relation of the blades with respect to the rotor. With high pressure fluid delivered to the motor through port 92 and port 93 open to the low pressure side of the system, fluid will be admitted to the pockets formed between the eccentric housing 140 and the rotor, and a driving torque will be developed which rotates the rotor in the counter-clockwise direction of rotation (Figure 4) of driving member 4, and as the pockets come into communication with the port 93 the blades are retracted and the fluid is discharged into the low pressure side of the system. The amount of torque delivered by the motor will obviously be dependent upon the eccentricity of housing 140 and the torque delivery is at maximum when the eccentricity of the housing is maximum. To reverse the rotation of the motor, port 93 is connected to the high pressure side of the system while port 92 is connected to the low pressure side of the system and a reverse rotation with torque delivery dependent substantially upon the eccentricity occurs.

The arrangement of the motor vanes, the spacing rings, the movable ring housing and the sealing tips are important features of my invention and it will be noted that the rings 223 and 223' function to positively shift the blades with relation to the rotor in operation of the motor, preventing the blades from sticking in the slots due to accumulation of dirt and at the same time prevent the vanes from flying outward under centrifugal force and exerting abnormal pressures on the housing at high speeds. The eccentricity of the housing and volumetric capacity of the motor may be changed by a simple shift operation of the housing which forces the vanes to assume the proper positions for effective operation with any volumetric capacity. It will also be noted that the sealing tips 219 will oscillate in their curved seats and will maintain a fluid seal over the ends of the vanes independently of the relative position of the housing and rotor, and at the same time the side wall and port constructions are such that once the tips are assembled in position they are held and guided by the motor end walls 87 and 105 in any operating position of the motor housing 140. While my novel rotor, housing, and vane constructions have been disclosed as embodied in a motor, it will be obvious to those skilled in the art that the constructions and principles embodied are applicable to variable capacity pump constructions and other uses that are contemplated as within the scope of the present invention.

Operation

Having described a complete embodiment of my improved transmission the operation thereof will now be set forth. To vary the torque and speed relations of the driving member 4 and tail shaft 18, the eccentricity of motor housing 140 with relation to rotor 216 is varied either manually or automatically as above set forth in detail.

To fill the transmission initially with fluid, housing 140 and the related parts may be shifted through the manual control to an eccentric position, the filling plug in cover 56 may be removed, and fluid fed into the fluid storage space 58. The fluid passes downward through ducts 59 into the central fluid storage space 38 and fills the central space in the mechanism lubricating bearings 82, 107, 115 and 116. From space 38 the fluid enters suction port 39 of valve plate 29 into low pressure or suction port 37 of the pump. After as much fluid has been filled into the circulating system as is possible in this way the prime mover is started into operation driving pump ring gear 7 which drives pinion 12 on eccentric 13 drawing fluid from port 39 through port 37, carrying it past sealing segment 10 and forcing it under pressure outward through high pressure port 35 of valve plate 29 and through hole or passage 26 into space 25 forcing diaphragm 22 to expand to the left in Figure 1 and holding check valve 27 closed. As a result, the pressure on the diaphragm will be transmitted through shaft 18 and thrust bearings 115 and 116 holding the motor and valve parts in fluid sealing relation against each other and casting 40, overcoming the fluid pressures tending to separate these parts. At the same time the fluid pressure in chamber 25 reacts against the pump side wall and holds the pump parts against each other and casting 40 in fluid sealing relation. The fluid from port 35 will pass through the annular ports 48 in communication therewith into high pressure fluid storage space 50 of casting 40. To drive the tail shaft in a forward direction the valve parts are positioned as shown in Figure 9 with the actuating member 96 in its lower position and the actuating member 98 in its uppermost position. In this position of valve parts, ports 90 in plate 86 marked "Low" will be in communication through corresponding aligned ports 88 of plate 85 with aligned ports 53 of the casting 40 and with the fluid in the storage space 38 of the valve casting 40, ports 90 marked "high" will be in communication with the high pressure fluid storage chamber 50 of casting 40 through aligned ports 88 and 51 of the valve plate 85 and the casting 40, respectively, while the remaining unmarked ports 90 will be blanked off. Fluid will then be circulated through the motor and will accordingly rotate tail shaft 18 in the direction of rotation of the driving coupling 4. The longitudinal thrust on shaft 18 which is transmitted through diaphragm 22, and by fluid in space 25 to the pump side wall 14 holds the pump, motor, and valve parts in fluid sealing engagement with a predetermined pressure in excess of the total fluid pressures tending to separate the faces, while permitting expansion and contraction of the parts in operation as the temperatures vary, as well as preventing undue deflection of the side walls resisting the escape of fluid pressure.

In addition to the driving force applied to the tail shaft by the hydraulic motor, the reaction due to pumping is transmitted through eccentric 13 and quill 17 to tail shaft 18. Shaft 18 will then rotate at a speed with relation to the speed driving member 4 that will depend upon the volumetric capacity of the motor per revolution of shaft 18 in well known manner. As shaft 18 rotates, valve or distributing member 29 will be driven thereby and the admission of fluid to and from casting 40 will be distributed to maintain rotation of shaft 18.

As the operation continues, the fluid, together with any air that may be contained in the system will be forced into chamber 38 and as the valve member 29 rotates with the tail shaft, fluid will pass from chamber 38 under the influence of centrifugal force through duct or passage 39 into port 37 while air entrained in the circulating fluid will pass upward through ducts 54 into the storage chamber 55 from which it will rise upward through the passages 59 of check valve 60 into space 58 and through a drilled hole in the filler cap to atmosphere. As the operation continues the air entrained in the fluid circulating system will be rapidly replaced by fluid and after the air has been eliminated the filling is continued until the fluid flows over wall 62 into the lubricating conduits 63' and overflow passages 64. After the circulating system has been filled with fluid the filling plug may be replaced and the operation may be continued while the oil or fluid is fed to the circulating pump of the mechanism, if the mechanism is connected to the oil pump and crank case of the engine. Fluid is then pumped through pipe connection 63 into the storage space 58 and the filling of the oil into the engine crank case continued until the proper crank case oil level is maintained continuously indicating that the fluid storage chambers of the transmission have been filled with fluid and that the fluid is overflowing into the conduits 63' and 64 lubricating the motor parts and collecting in casing section 65, and passing through pipe connection 66 and pipe into the engine crank case or to the suction side of either a transmission or engine circulating pump.

It will accordingly be seen that when the mechanism is filled with fluid all of the operating parts are properly lubricated and any air entrained in the fluid during power transmitting operations will pass out of the circulating system from space 38 through a suitable air outlet hole in the filling plug without causing formation of emulsion, and the mechanism is operative for power transmitting purposes.

With the parts positioned as shown in the drawings, while the mechanism is transmitting power and with motor housing 140 concentric with the rotor 216 the volumetric capacity of the motor is zero. With the motor at zero capacity no fluid can be circulated between the pump and the motor and the pump parts are hydraulically locked together. Under these conditions the pump serves as a hydraulic clutch locking the driving member 4 to the tail shaft 18 for rotation in the same direction and at substantially the same speed, and the transmission is in direct couple.

The pressure developed on the fluid under such a condition depends upon the torque demand on the tail shaft, and the parts are preferably so proportioned and arranged that so long as the load on the tail shaft can be efficiently handled directly by the prime mover the parts will remain in direct couple. When the load on the tail shaft increases so that a greater torque demand is made thereon than can be delivered directly and with efficiency by the prime mover, the pressures developed in the pump unit increase to the point where valve 174 will be actuated causing piston 155 to shift motor housing 140 as above set forth automatically thereby increasing the volumetric capacity of the motor and its torque multiplication until a new balanced condition has been reached. In the new position of parts the speed of the tail shaft will be reduced below the speed of the driving member 4 and the torque will be multiplied to handle the increased load. As the load on the tail shaft varies the fluid pressures developed by the pump will vary, varying the position of the motor housing, and accordingly the torque multiplying ratio of the mechanism to meet the varied torque demands. As the load on the tail shaft decreases piston 155 will shift the motor housing to the left in Figure 4 decreasing the volumetric capacity of the motor and the torque multiplying ratio of the mechanism, and when the load decreases to the point where it can be efficiently handled by the prime mover in direct couple, the motor housing will be brought to its concentric position where pumping of fluid will again cease or until it abuts against the end of the manual control member 201 establishing a manually predetermined transmission ratio. In this way it will be seen that a transmission mechanism is provided in which the torque multiplying ratio may automatically be varied as the load on the tail shaft increases above a point which may be predetermined by the proportions of parts selected and by the positioning of member 201 under manual control.

To establish a direct couple condition while relieving the motor and automatic control parts from pressure for high speed operation the valve parts are shifted to the position shown in Figure 10 with actuating members 96 and 98 in their lowermost positions. In this position of parts the ports 90 marked "Low" will be in communication through ports 88 of plate 85 with the low pressure fluid storage space 38 in casting 40 through aligned ports 53, while the remaining passages will be blanked off. Low pressure fluid will accordingly be admitted to the entire motor while the high pressure fluid will be locked in space 50 of casting 40 and the pump parts, establishing a hydraulic lock condition of the pump parts.

To establish a reverse drive of tail shaft 18, the valve parts are positioned as shown in Figure 11 with the operating extension 96 in its upper position and the operating member 98 in its lower position. High pressure fluid will then be admitted to the motor through ports 90 marked "High" which will be in communication with ports 51 of casting 40, while the ports 90 marked "Low" will be in communication with ports 53 of casting 40 and the remaining valve ports will be blanked off. Under these conditions the circulation of fluid through the motor will cause rotation of the tail shaft 18 in an opposite direction to the direction of the driving member 4. It will, however, be noted that due to the functioning of valve 189 (Figure 14a) fluid pressures will be admitted to the automatic control mechanism as above set forth to vary the eccentricity of the motor housing and the torque ratio of the mechanism in accordance with the load on the tail shaft, or the lowest ratio may be held fixed by the manual control.

To establish a neutral condition in the mechanism so that the driving connection 4 and pump gears may be driven without driving the tail shaft, member 96 is shifted by means of suitable controls to a position midway between the position shown in Figures 9 and 11, to rotate clutch plate 86 until ports 88 and 89 of clutch plate 85 will overlap or interconnect ports 51 and 53. In this position of parts, a circulating path for the fluid will be established between fluid spaces 38 and 50 of casting 40 independently of the motor, preventing the building up of sufficient pressures by the action of the pump to produce rotation of the tail shaft 18 against a substantial resistance.

When it is desired to utilize the mechanism for rapid deceleration for braking purposes, member 201 is set manually to hold motor housing 140 at the minimium eccentricity that will give the desired torque ratio and braking effect. With the parts in this position, as the wheels drive the tail shaft, the motor unit will function as a pump, fluid pressures will be built up on the suction side of the system, and in the fluid storage space 38 closing check valve 60 and fluid will be forced under pressure into the pump unit unseating check valve 27 and causing the pump to function as a motor tending to speed the engine ahead of the tail shaft at a rate depending upon the eccentricity of housing 140. The fluid entering space 25 through check valve 27 will force diaphragm 22 to the left in Figure 1 holding the motor and pump parts in operative fluid sealing relationship against the pressures tending to separate them. In this way it will be seen that the compression of the engine may be utilized for braking purposes. When designing the valve size to produce the proper balance condition on the face of valve 29 as well as the diaphragm size, it is necessary to proportion the chamber 38 and the areas of the through ports 48 so that regardless of which area comes under high pressure there will not be a tendency to break the fluid sealing relationship of the pump parts or the motor parts. The diaphragm reacting areas are made large enough to take care of alternate conditions.

Modifications

Having described one complete embodiment of my invention adapted for use as a transmission in a motor vehicle, modifications of the invention will now be set forth. In the modifications parts similar to those shown in the form heretofore described have been designated by like reference characters, and reference may be had to the description of these parts heretofore given for a full understanding thereof, reference being had only to so much of the parts common to the parts heretofore described as will be necessary for an understanding of the present invention to be had.

In the form of invention illustrated in Figure 1, a special arrangement of radial and thrust anti-friction bearings is disclosed for supporting heavy thrusts at comparatively high speeds. In the form of invention shown in Figure 17 the bearing arrangement has been modified to permit the utilization of standard types of roller bearings adapted to withstand combined radial and thrust loads for high speed service.

In this form of invention, a roller bearing assembly indicated generally by the numeral 230 is substituted for the radial ball bearing 82 mounted in tubular extension 81 of casting 40. The bearing assembly 230 comprises a cage 231 slidably mounted in the central bore formed in the extension 81 of casting 40 which is held against rotation by a key member or pin 232 supported in and extending through extension 81, the inner end of which fits slidably into a key-way cut into cage 231. Secured in the cage 231 are the outer bearing races 233 which support annular series of conical rollers 234 which are held in position by retaining and spacing rings 235. Supported on the rollers 234 and secured on tail shaft 18 by means of the securing nut 84 are the inner conical bearing races 236 which are separated by the spacing ring and shims 237. In addition, bearings 107, 115, and 116, together with the related thrust structure are replaced by a combined radial and thrust roller bearing assembly indicated generally by the reference numeral 238. Bearing assembly 238 comprises outer conical races 239 pressed into position in cylindrical extension 104 of motor end wall member 105. Races 239 support an annular series of conical rollers 240 held in position by retaining rings 241. Rollers 240 support the conical races 242 which are separated by the shims and spacing ring 243 and held in position on tail shaft 18 by the threaded securing collar 244. Secured in position against the outer end of cylindrical extension 104 of end wall member 105 is a cap 245 which is held in position by means of cap screws 246. The periphery of collar 244 extends through a central opening in cap 245 and a packing leather 247 is secured between a retaining member 248 and cap 245 by means of the rivets 249. Leather 247 is held in fluid sealing position against the cylindrical surface of collar 244 by means of spring fingers formed on retaining member 248 by suitable slots. Secured to the end of casing section 65 by means of the cap screws 250 is an end cap 251 provided with an extension 252 encasing the collar 244, and which is provided with suitable packing 253 to prevent loss of fluid around the hub 122 of the brake and drive member 123.

The general operation of the modification shown in Figure 17 is the same as that set forth in connection with Figures 1 to 16. The fluid pressures developed in chamber 25 acting upon diaphrams 22 transmit an end thrust to tail shaft 18 through bearing assembly 238 to hold the motor side wall 105 against the motor housing 140, while the parts are free to expand and contract with temperature variations without causing binding of the parts or fluid leakages to develop.

In the form of invention shown in Figures 18 and 19 the motor blade or vane construction is shown to eliminate the sealing tips 219 and vane guiding rollers 221. In this form of the invention a set of motor blades or vanes 255 are substituted for the vanes 218 and are provided with aligned extensions 256 which engage the motor rings 223 and 223' without the interposition of rollers. Cut into the sides of the vanes 255 are shallow narrow grooves 257 which are inclined at opposite angles on opposite sides of the blade as shown and cut into the outer edges of the blade is a pair of shallow narrow sealing grooves 258. The angular arrangement of grooves 257 in the sides of the vanes permits lubricant to flow downward and to be distributed across the faces of the vane as they reciprocate in the rotor slots. At the same time there is no substantial weakening of the blades due to formation of clearage planes in them by the cutting of the grooves into the surface thereof.

In order to increase the life of the wearing surfaces of the mechanism and to guard against scoring due to the presence of dirt or grit in the fluid, all of the wearing parts, such as the interior of the motor housing, the vanes, and the valve and timing surfaces may be plated with a thin hard coating of chromium metal, which in addition to increasing the life of the surfaces resists corrosion and tends to prevent gumming or scoring of the operating surfaces of the mechanism.

Instead of the rotary vane type motor constructions utilized in the forms of invention disclosed in Figures 1 to 19 inclusive, as shown in Figures 20 to 22, reciprocating piston types of motors may be utilized. In this form of invention the pump constructions and the fluid receiving and distributing casting constructions are substantially the same as in the forms of invention heretofore described with the following noted exceptions. Slidably keyed in tubular extension 81 of the casting 40, is a sleeve 260 with which the fluid distributing plate 261 (Figures 20 and 21) is integrally formed. Fluid distributing plate 261 abuts against valve plate 86 and has formed therein the fluid distributing slots 262 and 263. Pressed into the cylindrical extension 260 and separated by the annular protrusion 266 thereof are the outer conical races 267 of combined radial and thrust roller bearings. Supported on the races 267 are the annular series of conical rollers 268 which in turn support the inner bearing races 269 and are held in position by retaining rings 270. Races 269 are mounted on the tail shaft 18, being held in position by locking nut 84 and separated by the ring and shims 271. Secured to the plate 261 by means of securing cap screws 272 is a cap 273 through a central opening of which an enlarged section of tail shaft section 18 extends. Secured to the cap 273 by means of rivets 274 is a packing leather 275 and a retaining member 276. Member 276 is formed of spring steel and slotted to form spring fingers which press the end of packing leather 275 about the enlarged section of tail shaft 18 forming a low pressure oil seal against leakage of fluid from the central storage space 38 into the interior of casing section 65.

The outer end of tail shaft section 18 in this form of the invention is slidably splined into a connecting member 277. Supported in and slidably splined to the connecting member 277 is a tail shaft end section 278 which adjacent its outer end is supported in a suitable anti-friction bearing 279 mounted in a supporting cage 280 which in turn is suitably supported for adjustment longitudinally in the end of casing section 65. The inner race of bearing 279 is held in position against a shoulder of the tail shaft section 278 by means of securing nut 281 and fluid leakage past bearing 279 from the interior of section casing 65 is prevented by cap 282 provided with the packing 282'. The mechanism to be driven is connected to the tapered end of shaft 278 protruding from the cap 282.

Journaled in suitable bearings mounted in casing section 65 are the trunnions 283 (Figure 22) of the motor tilting or angle box structure 284, through a central opening of which the tail shaft section 278 extends. Cast integrally with the tilting box 284 is the control lever arm extension 284' to which either the automatic control cylinders or the manual control connect. Rigidly secured to the tilting box 284 is the inner race 285 of an anti-friction bearing 286, the outer race 287 of which is mounted or secured in the angle plate or wobble disk structure 288 of the motor. Secured in the angle plate 288 is an annular series of seating sockets 289 preferably nine in number, in which the ball ends 290 of the piston rods 291 are held by the threaded caps 292. The inner ends of piston rods 291 are connected by suitable ball and socket connections (not shown) to reciprocating motor pistons 293 which are mounted for reciprocation in the annularly arranged motor cylinders 294 preferably nine in number. Motor cylinders 294 are formed in a cylinder block 295 and each cylinder is provided with a port 296 in well known manner, alternately establishing communication with ports 262 and 263 of the distributing plate 261. Cylinder block 295 is rigidly supported on a casting 297 which in turn is supported for rotation with connecting member 297' in a manner permitting limited universal seating movement of the cylinder block in well known manner against face 264 of the distributing plate 261 about the curved surfaces 298 of a square section of coupling member 277.

Interposed between the end of coupling member 277 and the web of a square central universal drive member 299 is a helical spring 300 which holds the motor cylinder block against the face 264 of plate 261 when no fluid pressures are developed in the system. Drive member 299 is formed integrally with the tail shaft section 278 and is provided with four cylindrical drive surfaces 301 (Figures 20 and 22) upon which the complemental cylindrical surfaces of drive shoes 302 are slidably supported. Formed integrally with each drive shoe 302 is a supporting trunnion pin 303 journaled in a cylindrically surfaced journal block 304 individual thereto. Blocks 304 are slidably supported in suitable recesses or bores 305 formed in angle plate 288 and the outer surfaces of shoes 302 slidably engage the flat driving surfaces 306 of the angle plate 288. Universal drive member 299 together with shoes 302 provide a universal driving connection between angle plate 288 and tail shaft section 278, the parts being so constructed that the center of universal movement lies in the axis of rotation of tilting box 284 about the trunnions 283.

If desired the angularity of tilting box 284 may be manually controlled, or it may be automatically controlled by a mechanism similar to that heretofore disclosed for shifting the motor housing 140 and would in this case be arranged to rock the angle box 284 about its trunnions 283 through the arm 284, in a manner that will be readily apparent to one skilled in the art.

In operation of this form of the invention, valve plates 85 and 86 are controlled as heretofore described to connect the ports 262 and 263 of distributing plate 261 to the high and low pressure chambers in accordance with the direction of rotation desired, and the circulation of fluid through the motor causes reciprocation of pistons 293 which react through the piston rods 291 against the angle plate 288 causing rotation of the angle plate together with the tail shaft sections 278 and 18, and motor block 295 in a direction depending upon the direction of flow of fluid through ports 262 and 263 in a manner that will be readily understood by those skilled in the art. With the tilting box 284 inclined at its maximum angle with relation to a plane normal to the axis of rotation of tail shaft section 278 a maximum torque multiplication and speed reduction will be secured. As the tilting box is brought towards a position in a plane normal to the axis of rotation of the tail shaft from that shown, the torque multiplication and speed reduction will be decreased. When the normal plane is reached the motor will be at zero volumetric capacity and the pump parts will be hydraulically held in direct couple and transmit the engine torque directly to the shaft 18.

In operation of this form of the mechanism, it will be noted that fluid pressures in chamber 25 acting on diaphragm 22 and on the pump side wall member 14 will cause the valve and pump parts to be held in fluid sealing relation with respect to casting 40 and each other, the valve parts being held in position by the end thrust exerted by tail shaft section 18 through the thrust bearing structure on sleeve 260 and plate 261, while the motor cylinder block 295 will be held seated against face 264 of distributing plate 261 by the overbalanced fluid pressure which hold the motor cylinder block seated on the valve face 264 (Figure 20) in a manner that will be understood by those skilled in the art. It will accordingly be seen that all of the pump valve and motor parts are held in proper balance fluid sealing relation during the operation of the mechanism so that the necessity for high pressure packing is eliminated.

Having described preferred embodiments only of the invention, it will be obvious to those skilled in the art that numerous variations may be made in the arrangement of the various combinations and details hereinbefore disclosed, and the various sub-combinations and principles are applicable to a wide range of independent uses without departing from the spirit of my invention. Accordingly, what is desired to be secured by Letters Patent and claimed as new is:

1. A hydraulic torque multiplying transmission apparatus comprising a driving member, a driven member, a fluid pump actuated by said driving member, a stationary housing, a variable capacity motor disposed within said housing in driving engagement with said driven member, and means for distributing fluid between said pump and said motor; said motor including a rotor having radially reciprocable blades, a control ring receiving said rotor and blades, a pair of approximately diametrically opposed members pivotally supporting said control ring on said stationary housing to permit said ring to be shifted substantially laterally with respect to the rotor to vary the motor capacity.

2. A hydraulic torque multiplying transmission comprising a driving member; a driven member; a rotary pump element actuated by said driving member; a rotary pump element actuated by said driven member; a rotary hydraulic motor driving said driven member and actuated by fluid delivered thereto by the difference in rotation of said driving and driven members; fluid distributing means interposed between said pump elements and said motor and comprising annular high and low pressure fluid storage spaces; said motor comprising relatively movable parts; and means carried by one of said pump elements and actuated by fluid pressures developed by said pump to hold the parts of said motor in fluid sealing relationship.

3. A hydraulic torque multiplying transmission comprising a driving member; a driven member; a rotary pump element actuated by said driving member; a rotary pump element actuated by said driven member; a rotary hydraulic motor driving said driven member and actuated by fluid delivered thereto by the difference in rotation of said driving and driven members; fluid distributing means interposed between said pump elements and said motor and comprising annular high and low pressure fluid storage spaces; and means, including a diaphragm actuated by fluid pressures developed by said pump, for holding the pump parts in fluid sealing relationship relative to each other and to said fluid distributing means.

4. A hydraulic transmission comprising a driving member; a driven member; pump elements actuated by the difference in rotation of said driving and said driven members; a variable capacity motor driving said driven member and actuated by fluid delivered thereto from said pump; stationary fluid receiving and storage means interposed between said pump and said motor; and annular plate valve means interposed between said stationary means and said motor adapted in direct drive to prevent admission of high pressure fluid from said stationary means to said motor.

5. The combination as set forth in claim 4 together with further plate valve means for relieving the fluid pressures in said motor, and to reverse the direction of rotation of said motor.

6. In a hydraulic transmission a driving shaft; a driven shaft; a pump operated by the difference of rotation of said driving and said driven shafts; a motor driving said driven shaft and actuated by fluid delivered thereto by said pump; fluid distributing valving comprising parts interposed between said motor and said pump; a radial and thrust bearing structure secured to said driven shaft and to one of said valve parts, and pressure operated means for shifting said shaft endwise to hold said valve parts in fluid sealing relationship.

7. In combination with the flywheel of a combustion engine, a hydraulic transmission apparatus connected to said flywheel, a stationary casing for said apparatus, said casing including a portion projecting into proximity to said flywheel and designed to collect any leakage or overflow fluid from the apparatus, and means carried and actuated by said flywheel for removing fluid from said projecting portion of the casing.

8. In combination, a rotary fluid pump, a fluid motor, means for driving said pump, means driven by said motor, and means for distributing working fluid between said pump and said motor; said rotary pump comprising a pair of side wall members, a rotor disposed between said members to form high and low pressure chambers, means connected to one of said side wall members to provide a pressure balancing chamber, a conduit interconnecting said balancing chamber and said high pressure chamber, a passageway for establishing communication between said balancing chamber and said low pressure chamber, and a check valve associated with and normally closing said passage-way.

9. A hydraulic transmission apparatus comprising a driving member and a pump actuated thereby, a driven member and a motor for driving the same, and means for distributing fluid between said pump and said motor; said pump comprising a pair of separable side wall members, one consisting of a side wall provided with an axial extension receiving said driven member and the other comprising a wall slidably mounted on said extension, and a rotor disposed between said side walls and surrounding said extension.

10. In the apparatus defined in claim 9, said member driven by the motor comprising a shaft projecting through said extension to support said side walls, said fluid distributing means being designed to resist movement of the pump toward the motor, a reactance means carried on the projecting end of said shaft, and means cooperating with said extension and said reactance means to thrust the separable side walls into fluid sealing engagement with said rotor.

11. In a hydraulic transmission apparatus, a driving member, a driven member, a pump actuated by said driving member, a stationary housing, a variable capacity motor disposed within said housing in driving engagement with said driven member, and means for distributing fluid between said pump and said motor; said motor including a rotor having radially reciprocable blades, a control ring receiving said rotor and blades, and means pivotally supporting said control ring from said stationary housing, whereby said ring is adjustable with respect to said rotor to vary the capacity of the motor.

12. In the apparatus defined in claim 11, a device, automatic in response to pressures developed in the apparatus, for shifting said control ring to meet varying load requirements.

13. In a hydraulic transmission apparatus, a driving member, a fluid pump actuated by said driving member, a driven shaft, a fluid motor for driving said driven shaft, means for distributing fluid between said pump and said motor, means tending to shift said driven shaft longitudinally in response to developed fluid pressures, and a thrust bearing structure interposed between said shaft and said motor; said thrust bearing structure comprising an extension carried by said motor and providing a reactance member, a plurality of anti-friction bearings reacting against said reactance member on individual seats formed thereon, and means associated with said driven shaft, for applying equalized thrust to said bearings to be transmitted through said reactance member to said extension.

14. In the apparatus defined in claim 13, said reactance member being separate from, and universally seated with respect to, said extension.

15. In the apparatus defined in claim 13, said last mentioned means comprising a sleeve surrounding said driven shaft and provided with a shoulder abutting at least one of said bearings, a thrust collar secured against longitudinal movement with respect to said shaft, and a plurality of thrust equalizing members mounted between said collar and said sleeve and in engagement with one of said bearings.

16. In a hydraulic transmission apparatus, a driving member and a driven member, a fluid pump actuated by the driving member, and a fluid motor for driving said driven member; and means for distributing operating fluid between said pump and said motor; said distributing means comprising a stationary device having a cylindrical portion, and at least one annular ported plate valve adjustably mounted on said cylindrical portion.

17. In the apparatus defined in claim 16, said cylindrical portion having a central recess, said driven member comprising a shaft extending concentrically through said recess, and a bearing assembly mounted on said shaft and fitted within said recess.

In testimony whereof I affix my signature
ALDEN G. RAYBURN.